United States Patent [19]

Hodgkins

[11] Patent Number: 4,612,600

[45] Date of Patent: Sep. 16, 1986

[54] LOW FIRE CERAMIC COMPOSITIONS

[75] Inventor: Charles E. Hodgkins, Lewiston, N.Y.

[73] Assignee: TAM Ceramics Inc., Niagara Falls, N.Y.

[21] Appl. No.: 665,917

[22] Filed: Oct. 29, 1984

[51] Int. Cl.[4] .................. H01G 4/10; H01G 1/01; C04B 35/46

[52] U.S. Cl. .................. 361/321; 29/25.42; 501/138

[58] Field of Search .............. 156/89; 264/56, 61, 264/65; 501/134–136, 137, 138; 361/320, 321; 29/25.42

[56] References Cited

U.S. PATENT DOCUMENTS

| | | | |
|---|---|---|---|
| 3,757,177 | 9/1973 | Buehler | 501/138 X |
| 3,760,244 | 9/1973 | McClelland | 501/138 X |
| 3,920,781 | 11/1975 | Eror | 264/61 |
| 4,082,906 | 4/1978 | Amin et al. | 428/539 |
| 4,089,813 | 5/1978 | Alexander | 252/520 |
| 4,115,493 | 9/1978 | Sakabe et al. | 264/61 |
| 4,121,941 | 10/1978 | Kawashima et al. | 501/135 |
| 4,308,570 | 12/1981 | Burn | 361/320 |
| 4,377,840 | 3/1983 | Nair | 361/320 |
| 4,386,985 | 6/1983 | Dirstine | 156/89 |
| 4,475,144 | 10/1984 | Lagrange et al. | 361/321 |

OTHER PUBLICATIONS

Handa, et al., "Low Temperature Fired High Dielectric Constent Ceramics for Multilayer Ceramic Capacitor" (May, 1984).

*Primary Examiner*—Donald A. Griffin
*Attorney, Agent, or Firm*—Kenyon & Kenyon

[57] ABSTRACT

This invention discloses multilayer capacitors having base metal electrodes sintered at temperatures less than about 950° C. with a lithium fluoride flux, and having a base metal oxide integument at the surface of the electrodes, as well as, a method for making such electrodes with dielectric compositions containing lithium fluoride flux and by adjusting the $PO_2$ in the sintering atmosphere to avoid oxidation of the base metal and reduction of the metal oxides in the dielectric ceramic.

9 Claims, No Drawings

LOW FIRE CERAMIC COMPOSITIONS

The present invention relates to the field of ceramic compositions and processes for forming electronic components particularly multilayer ceramic capacitors at low sintering temperatures with base metal electrodes.

BACKGROUND OF INVENTION

In their simplest form ceramic capacitors consist of a relatively thin wafer or layer of desired shape and size formed by firing or sintering a ceramic dielectric composition, the layer having electrodes sintered on to the opposite faces thereof. In many cases, however, it is desired to use a capacitor having a plurality of such layers alternating with conductive layers, i.e. electrodes. Alternate electrodes being exposed at the same edge faces of the capacitor and electrically joined there, for example, by a termination electrode.

In a typical known method for producing such ceramic capacitors an electroding paste, sometimes called ink, including a noble metal, such as platinum or palladium, is applied to the top face of a small, usually cast, thin sheet of a suitable ceramic dielectric composition bonded with an heat vaporizable organic binder, the application being made in such manner that the deposit of electroding paste extends to one edge of the sheet only and a clear margin is left around three sides of the deposit. A plurality of the small sheets thus coated with electrode paste are then stacked, successive sheets being rotated about an axis normal to the plane of the sheet, whereby successive electroding paste deposits extend to opposite edges of the stack. The stack of paste-coated sheets is then suitably consolidated and heated to drive off or decompose the organic binders of the ceramic sheet and the electroding paste and to sinter the dielectric composition into a unitary, multilayer body having successive electrodes exposed on opposite ends thereof. The electrodes exposed on each end are then electrically connected with a termination electrode in known manner. The noble metals are used to form the electrodes because their melting points are higher than typical sintering temperatures and their resistance oxidation.

Because of the necessity for using noble metal internal electrodes in the process just described, such ceramic capacitors are expensive. Lower cost metals, such as silver can be used for electrodes if the dielectric compositions can be sintered at low enough temperatures to avoid melting, vaporization, and oxidation of the silver. Moreover, silver, while cheaper than the noble metals, is still very expensive. Accordingly, a method of producing capacitors that does not require the use of noble or very expensive metals is desirable.

The method disclosed in U.S. Pat. No. 4,082,906 avoids noble metal electrodes by using ceramic dielectric compositions including LiF and rapid low temperature sintering ($\leq 900°$ C.) in air. Due to the low sintering temperature of these materials it is possible to form a multilayer ceramic capacitor, hereinafter MLC, with up to 100 percent silver internal electrodes. The manufacturing cost of such MLCs is significantly reduced because they do not require electrodes containing large amounts of noble metals, such as Pd, Pt, or Au. However this process cannot be used with easily oxidized base metals such as copper.

Alternative approaches for producing ceramic capacitors with inexpensive metal electrodes which employ ceramic dielectric compositions produced by high temperature sintering ($\geq 1300°$ C.) of barium titanate in reducing or non-oxidizing atmospheres with selected modifiers, are disclosed in U.S. Pat. Nos. 3,920,781; 4,386,985; 4,089,813. The internal electrodes in these ceramic capacitors are a base metal, such as nickel or nickel alloy having a melting point greater than the sintering temperature. The non-oxidizing atmospheres are necessary to avoid oxidation of the base metal during sintering and concomitant loss of its electrical conductance.

It is also important in some of these processes to employ $BaTiO_3$ having a ($BaO:TiO_2$) mole ratio greater than 1 to avoid reduction of the metal oxides in the dielectric compositions to an electrically conductive state or otherwise deteriorate the dielectric's properties.

Yet another approach to avoiding the use of expensive noble metal electrodes in ceramic capacitors involves forming sintered ceramic bodies having void spaces therein and thereafter injecting lower melting point base metals, such as lead, into the void spaces to form the electrodes. Such processes are described in U.S. Pat. Nos. 3,679,950 and 3,879,645.

An object of the present invention is to provide dielectric compositions that may be sintered in non-oxidizing atmospheres at low temperatures, about 950° C. or less, and useful with inexpensive base metal electrode material for forming MLCs.

Another object of the present invention is to provide a method for manufacturing ceramic capacitors at low sintering temperatures, i.e. less than about 950° C., with base metal electrodes in non-oxidizing atmospheres wherein the oxygen partial pressure ($PO_2$) is adjusted to avoid base metal oxidation and deterioration of the ceramics electrical properties.

Yet another object of this invention relates to ceramic dielectric compositions that can be sintered into dense ceramic bodies at ultra-low temperatures ($\leq 950°$ C.) in atmospheres having reduced oxygen concentrations.

The dielectric compositions of this invention allow the manufacture of high quality MLCs with low cost base metal electrodes, such as copper, nickel, cobalt, iron and/or their alloys. The manufacturing costs are reduced as compared to the prior art because copper, nickel, cobalt, iron and their alloys are much less expensive than silver and nobel metals. Moreover, sintering at lower temperatures reduces the energy costs and increases the lifetime of processing equipment such as kilns.

SUMMARY OF THE INVENTION

It has been discovered that sintering a ceramic dielectric composition and base metal electrodes at ultra-low temperatures, i.e. about 700°–950° C., said dielectric composition comprising a titanate compound having the general formula $MTiO_3$ such as barium titanate, strontium titanate and calcium titanate, and having a $MO:TiO_2$ mole ratio greater than about 1.00, preferably between about 1.00 and 1.03, and most preferably about 1.02 and further including a liquid vapor phase sintering LiF flux or precursor thereof that forms the LiF in situ during sintering, such as, as combination of $Li_2CO_3$ and $NH_4F$; in atmospheres wherein the partial pressure of oxygen hereinafter, $PO_2$, is adjusted to prevent oxidation of base metals and the depletion of oxygen from the dielectric ceramic composition. Ceramic capacitors formed by this method include a base metal oxide integument formed on their electrode surfaces that is believed to significantly contribute to the electrical properties of such components. The ceramic capacitors produced by cofiring the above ceramic dielectric with copper as internal electrodes in a reduced $PO_2$ atmosphere and at temperature less than 950° C. exhibit high dielectric constants and a capacitance change with temperature relative to capacitance at 25° C., within +22% and −56% from 10° C. to 85° C., designated by EIA and acknowledged by industry as acceptable Z5U characteristics.

DETAILED DESCRIPTION OF THE INVENTION

In accordance with the present invention ceramic capacitors can be produced from a dielectric composition comprising about 93 to about 99 wt. % of $MTiO_3$ having $MO:TiO_2$ ratio between about 1.00 and 1.07; about 1.5 to about 7.0 wt % of a sintering LiF flux or precursors thereof that form LiF during sintering at temperatures less than about 950° C. and in adjusted $PO_2$ atmospheres in combination with base metal electrode materials.

It will be appreciated by those skilled in the art that the stoichiometric excess of MO simply represents an excess of a metal oxide capable of occupying the barium site in the Perovskite crystal structure and that BaO, SrO, MO, and CaO are such oxides. M is simply used to collectively represent the alkali earth metal ions that form Perovskite crystal structures.

The barium titanate ($BaTiO_3$) or similar compounds useful in the practice of the present invention may be produced by various processes well known to those skilled in the art and is readily available from commercial sources. The $BaTiO_3$ used in the Examples described herein was prepared from high purity barium carbonate and rutile titanium dioxide slurried in an ammonia dispersant and milled with zirconium dioxide. The milled slurry was dried, pulverized, and calcined at about 1100° C. The relevant chemical assay of this material is summarized in Table 1 below.

TABLE I

| Oxide | Wt % |
| --- | --- |
| BaO | 65.5–66.5 |
| $TiO_2$ | 32.0–33.5 |
| $SiO_2$ | <0.01 |
| $Al_2O_3$ | <0.07 |
| $Fe_2O_3$ | <0.006 |
| CaO | <0.02 |
| $Nb_2O_5$ | <0.01 |
| $ZrO_2$ | <0.01 |
| SrO | 0.7 |
| $BaO:TiO_2$ | 1.0–1.06 |
| Average Particle Size | 1.0–1.2 μm |

The fluxes of the present invention are believed to provide free Li and F, e.g., by the dissociation of LiF under sintering conditions. The desired quantity of LiF can be added directly to the dielectric composition or combinations of lithium precursors including Li salts, such as, $LiCO_3$, LiI, LiBr and $LiNbO_3$; and flourine precursers such as $NH_4F$ and $MnF_2$; which provide the fluxing necessary to lower the sintering temperatures of the dielectric compositions to less than about 950° C. under process conditions.

Surprisingly, the presence of free fluorine and hydrogen in the reduced $PO_2$ atmospheres of the present invention does not produce hydrofluoric acid which would be expected to dissolve the ceramic materials resulting in an inoperative process. Moreover, the insulating properties of the ceramic do not deteriorate from the reduction of various metal oxides therein to metals as might be expected under the prescribed sintering conditions particularly the control of (reduced) available oxygen by $PO_2$ adjustment.

The base metal electrode materials of the present invention include metals and alloys thereof having melting points greater than about 950° C. for example manganese, cobalt, iron, nickel and, preferably, copper. Copper is preferred because of its low cost and superior electrical properties. Copper is a better conductor of heat and electricity than other inexpensive electrode materials. The electrode materials may also be base metal precursors that are converted to based metals under sintering conditions, e.g., copper oxide that is converted to copper metal under sintering conditions.

The non-oxidizing sintering atmospheres of the present invention prevent oxidation of the base metals during sintering and concomitant loss of their electrical properties. They are also believed to cause the formation of an integument of base metal oxide on the electrode surfaces. Such atmospheres include $H_2$, $NH_3$, $CO/CO_2$, and $H_2/CO_2$ having a $PO_2$ adjusted as disclosed herein. A preferred atmosphere is 92% $N_2$/8% $H_2$ plus $CO_2$ which is non-explosive and easy to handle. The available oxygen of the sintering atmosphere ($PO_2$) is controlled to prevent oxidation of the electrode material at the desired sintering temperature and reduction of the metal oxides in the dielectric composition.

EXAMPLES 1 to 9

Dielectric compositions having the formulations shown in Table II below, were prepared as follows: the $BaCO_3$ $TiO_2$, and LiF were added to 100 grams of $BaTiO_3$ with 50 cc of distilled water. The slurry was mixed thoroughly in a high speed Spex paint mixer for 10 minutes. The resultant slurry was then dried into a cake and ground in a mortar and pestle. 8 cc of a binder solution including 26 wt. % water, 26 wt. % propylene glycol and 48 wt % corn syrup were mixed into the ceramic powder in a mortar and pestle and the mixture was then granulated through a 40 mesh nylon screen.

TABLE II

| Example | $BaTiO_3$ (g) | $BaCO_3$ (g) | $TiO_2$ (g) | LiF (g) | $BaO:TiO_2$ *mole ratio |
| --- | --- | --- | --- | --- | --- |
| 1 | 100 | 0 | 0 | 2.0 | 1.04 |
| 2 | 100 | 0 | 2.4 | 2.05 | 1.01 |
| 3 | 100 | 0 | 4.8 | 2.10 | 0.98 |
| 4 | 100 | 5.91 | 0 | 2.05 | 1.07 |
| 5 | 100 | 11.80 | 0 | 2.10 | 1.10 |
| 6 | 100 | 2.96 | 0 | 2.03 | 1.055 |
| 7 | 100 | 8.86 | 0 | 2.08 | 1.085 |
| 8 | 100 | 2.96 | 0 | 2.05 | 1.055 |
| 9 | 100 | 8.86 | 0 | 2.10 | 1.085 |

*calculated value

Discs of the resultant mixture having a diameter of 1.27 cm and a thickness of 0.1 to 0.15 cm were pressed at a pressure of 38,000 lbs. per square inch in a stainless steel die. The discs were placed on a low mass alumina oxide setter and fired at temperatures of 850° C. to 1000° C. for 2 to 5 hours in air.

After cooling, silver electrodes were painted on the discs which were then fired at 815° C. to sinter on the electrodes. The capacitance (C), dissipation factor (DF), and capacitance change with temperature versus capacitance at 25° C. (TC) were then measured with Model ESI2110A capacitance bridge at 1 KHz measurement frequency, from −55° C. to +125° C. at selected intervals. The dielectric constant of each sample was then calculated from the fundamental capacitance equation:

$$K = 5.66 \times C \frac{l}{D^2} \times 10^{12}$$

where:
K = dielectric constant of the sample;
l = thickness of the disc in inches
D = diameter of the disc in inches
C = capacitance of the disc in pico farads The dielectric properties of Examples 1 to 9, summarized in Table III below, demonstrate that the ceramic composition of this invention can be sintered to dense body at temperatures lower than 950° C. The dielectric constants (K) of such ceramics are typically higher than 5000, the dissipation factors (DF) are typically less than 1.5%, the capacitance change vs temperature (TC) meets the Z5U standards.

The importance of the BaO:TiO₂ mole ratio is also demonstrated in these Examples. When the BaO:TiO₂ mole ratio is less than 1.0, as in Examples 2 and 3, the ceramic dielectric cannot be sintered to dense body and thus it is of no use for producing MLC components. When the BaO:TiO₂ mole ratio is greater than 1.07, as in Examples 7 and 9 the dielectric constant is lower than 3000, such ceramic compositions are of little practical value in MLC applications. However, it is possible that somewhat higher or lower mole ratios can be advantageously employed with compositions that differ from those specifically described herein.

TABLE III

| Example | K | DF (%) | TC (%) @ 15° C. | TC (%) @ 85° C. |
|---|---|---|---|---|
| 1 | 8360 | 0.48 | +3.2 | −57.4 |
| 2 | | Does not sinter | | |
| 3 | | Does not sinter | | |
| 4 | 6860 | 0.60 | +5.6 | −51.3 |
| 5 | 5030 | 0.60 | −1.2 | −54.0 |
| 6 | 2550 | 1.05 | +21.3 | −38.4 |
| 7 | 1850 | 0.90 | +8.4 | −8.5 |
| 8 | 2890 | 0.76 | +9.7 | −42.9 |
| 9 | 1454 | 1.12 | +14.3 | −12.0 | were mixed and milled with a plastic binder system comprising vinyl butyral, plasticizers, and solvent. This slurry was cast on polypropylene film at a thickness of 35 μm, dried and stripped. The tape was framed and printed using a TAM Cladan TM 134 printer and subsequently laminated and cut into green MLC units using a TAM Cladan model 109 and 101 punch laminator and cutter, respectively. Such processes for fabricating MLC components are well known and understood in the industry.

The electrode inks were 42% metal loaded and applied through a 325 mesh (44 μm) screen. The dried printed electrode films were 9μm thick. The lamination temperature was 65° C. and the lamination pressure was 140 K gm/cm². Examples with copper and pure silver internal electrodes were also produced and evaluated for comparison.

The green multilayer chips were placed on low-mass compressed alumina setters, then subjected to a binder' burnout cycle' up to 260° C. The samples were then terminated with the same silver or copper electrode inks at the ends to connect all the internal electrodes. Afterwards they were inserted into a gas tight tube mounted in a gradient furnace.

The MLC units were then fired at 850° C. to 950° C. under reduced (PO₂) partial pressure of oxygen. The reduced atmosphere was established by passing gas mixtures of high-purity 92:8, N₂:H₂ and high purity CO₂ supplied by the Linde Division of Union Carbide through the tube. The total flow rate was approximately 500 cc/min and was metered and regulated using calibrated Fisher-Porter meters. The partial pressure of oxygen (PO₂), was calculated according to gas flow ratio, temperature, the base metal being used, and published thermodynamic data. The gradient furnace temperatures were probed and controlled using a series of Pt/Pt-Rh 90/10 thermocouples. The sintered capacitors had 5 active dielectric layers with a thickness of about 1.7 to 1.9 mil. The dielectric constant (K), dissipation factor (DF), insulation resistance (R) and capacitance (C) product at 25° C., and the capacitance change with temperature versus capacitance at 25° C. (TC) was measured with the same instruments as described in Examples 1–9. The measurements were again performed at selected intervals from −55° C. to 125° C. The results are summarized in Table V below.

TABLE V

| Ex. | Electrode | Firing | PO₂ | K | DF | TC (%) +15° C. | TC (%) +85° C. | RC @ 50 V, 2 min. 25° C. |
|---|---|---|---|---|---|---|---|---|
| 10 | Ag | 850° C.–950° C., 4 hrs | 10−88.8 atm. | 6165 | 7.69 | −3.8 | −57.8 | <100 |
| | Cu | 850° C. 950° C., 4 hrs. | 10−8.8 atm. | 5708 | 3.56 | 6.7 | −60.9 | <100 |
| 11 | Ag | 900° C., 4 hrs | Air | 5806 | 0.91 | −4.2 | −52.8 | 2200 |
| | Cu | 850° C.–950° C., 4 hrs. | 10−9.2 atm. | 7710 | 2.83 | −2.2 | −69.8 | 4000 |

EXAMPLES 10-11

The dielectric compositions having the formulations shown in Table 4.

TABLE IV

| Example | BaTiO₃ (g) | LiCO₃ (g) | LiF (g) | NH₄F (g) | MnCO₃ (g) | MnF₂ (g) |
|---|---|---|---|---|---|---|
| 10 | 975 | 35.2 | 0 | 34.6 | 0 | 1.7 |
| 11 | 975 | 0 | 15 | 0 | 3.97 | 0 |

Examples 10-11 demonstrate that the MLC Examples had a dielectric constant exceeding 5000. The dielectric composition of Example 11 had the additional advantage of having dissipation factor of less than 3% and a RC product greater than 2000. The TC characteristics of both example 10 and 11 met the Z5U specification.

Of particular importance in sintering ceramic compositions as described in Examples 10 and 11 is the establishment of proper oxygen partial pressure, PO₂. If the PO₂ is above the critical oxidation level for the base metal, such as copper, portions of the metal becomes totally oxidized, e.g. copper oxide, and looses its electrical conductivity and cannot function as an internal electrode. Such MLC units are useless because they will have very low capacitance and poor dielectric properties. The values of the critical $PO_2$ for each base metal is readily available from published thermodynamic data.

Moreover, if the $PO_2$ is too low, although the electrodes are prevented from oxidation, the ceramic itself will be reduced and becomes semiconductor, i.e., loses its function as dielectric material. The MLC units will then have (1) large grain growth, (2) low insulation resistance (3) very high dissipation factor, and (4) poor voltage breakdown, although the dielectric constants may appear to remain high.

At a proper $PO_2$ range below the critical oxidation value the metallic ions, e.g. copper, nickel, and the like, appear to diffuse to some extent, into the ceramic dielectric, along its grain boundaries. Simultaneously, the ceramic dielectric will be reduced to some extent and release oxygen. The metallic ions are believed to combine with the oxygen to form the base metal integument, i.e., a metal oxide insulation layer, such as $Cu_2O$, $NiO$. These oxide layers prevent the ceramic from further reduction and also provide desirable electrical insulation resistance. The proper balance of the two mechanisms to generate useful dielectric and MLC capacitors must therefore be established through proper selection of the ceramic composition, electrode material, and $PO_2$. The $PO_2$ is further related to the gas ratio and sintering temperature.

The dielectric properties of Example 10 with silver electrodes shows that the ceramic is reduced more than desirable, so that the DF is high and RC is low. When copper base metal is used for electrodes the diffusion of copper and formation of a copper oxide integument provided improvement in DF. The DF and RC of Example 10 could be improved by sintering the sample at a slightly higher partial pressure of oxygen.

In Example 11, manganese ions were introduced into the $BaTiO_3$-LiF base ceramic in the form of $MnCO_3$. The equivalent amount of manganese is also higher than that in Example 10, which used $MnF_2$ as a source of manganese. The dielectric properties of Example 11 shows that the increasing the amount of manganese the ceramic is made much more resistant to semiconduction when sintered in even slightly lower $PO_2$ as compared to Example 10.

Manganese, mostly due to its multivalence states ($+2, +4$, etc.) and its ability to function as an acceptor ion in both A and B sites, has been commonly used in $BaTiO_3$ based dielectric materials to improve their insulation resistance.

The dielectric properties of Example 11 can be further improved by sintering the sample at slightly higher partial pressure of oxygen.

While the present invention has been described in connection with the preferred embodiments as illustrated by the Examples, it is apparent that various changes and modifications, in addition to those mentioned above, may be made by those skilled in the art without departing from the basic features of the invention. Accordingly it is the applicants intent to protect all variations and modifications within the true spirit and valid scope of this invention.

What is claimed is:

1. A method for making ceramic capacitors, which comprises the steps of:
   (a) forming a sheet from a dielectric composition including a M $TiO_3$ compound, a metal oxide capable of occupying the barium site in a Perovskite crystal structure and a lithium fluoride flux or precursor thereof wherein the mole ratio of metal oxide to $TiO_2$ is greater than about 1.00;
   (b) coating at least a portion of the sheet with a base metal electrode material;
   (c) sintering the coated sheet at a temperature less than about 950° C. so that an integument of base metal oxide is formed at the surface of electrode material,
   and the sintering is conducted in an atmosphere having a $PO_2$ adjusted so that it prevents oxidation of the base metal without significantly reducing the metal oxides in the dielectric composition.

2. The method recited in claim 1, wherein:
   the $MTiO_3$ compound is from the group consisting of $BaTiO_3$, $CaTiO_3$, and $SrTiO_3$; the metal oxide is selected from the group consisting of BaO, CaO, and SrO and the molar ratio is between 1.00 and 1.03.

3. The method recited in claim 2, wherein:
   the $MTiO_3$ Compound is $BaTiO_3$, the base metal is copper and the mole ratio is about 1.02.

4. A ceramic capacitor comprising:
   a plurality of dielectric layers formed by sintering in a non-oxidizing atmosphere a composition including an M $TiO_3$ compound selected from the group consisting of $BaTiO_3$, $CaTiO_3$ and $SrTiO_3$, and a lithium fluroide flux or precursor thereof having a mole ratio of MO to $TiO_2$ is greater than about 1.00; and a plurality of electrode layers between the dielectric layers formed from a base metal electrode material; and a base metal oxide integument at the surface of the electrode layers.

5. A multilayer ceramic capacitor, comprising:
   a plurality of dielectric layers having a plurality of base metal electrode layers disposed therebetween and a metal oxide integument at the electrode layer's surface.

6. The multilayer ceramic capacitor recited in claim 5, wherein:
   the dielectric layers are formed from a composition comprising about 93-99 wt % $MO:TiO_3$ compound and has a $M:TiO_2$ mole ratio of between about 1.00 and 1.07; and the base metal is selected from the group consisting of manganese, iron, nickel, cobalt, copper and their alloys.

7. The multilayer ceramic capacitor recited in claim 6, wherein:
   the $MTiO_3$ compound is $BaTiO_3$ and the base metal is copper.

8. A base metal/ceramic structure comprising:
   a base metal layer cofired with a dielectric ceramic layer having an integument layer of base metal oxide disposed therebetween.

9. The structure according to claim 8 wherein:
   the base metal is copper and the base metal oxide is copper oxide.

* * * * *